N. TESTRUP.
TREATMENT OF SEWAGE AND THE LIKE.
APPLICATION FILED FEB. 7, 1912.
1,116,953.
Patented Nov. 10, 1914.
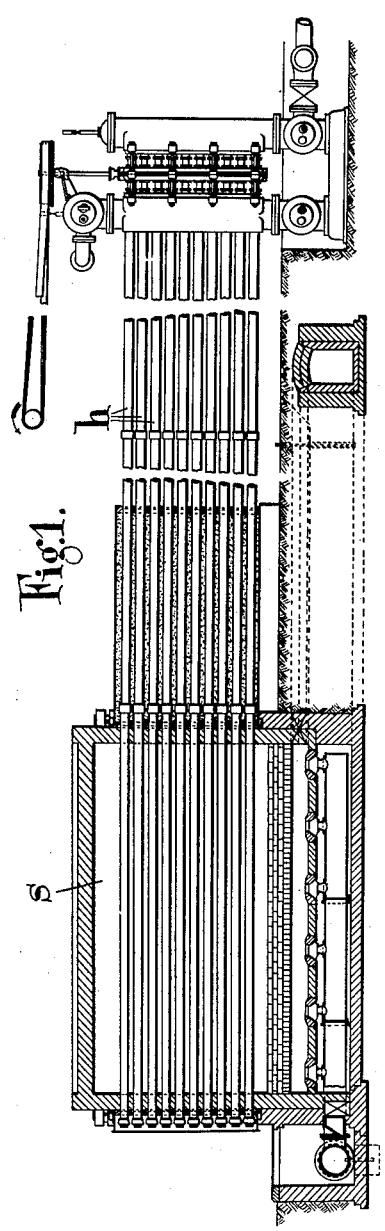
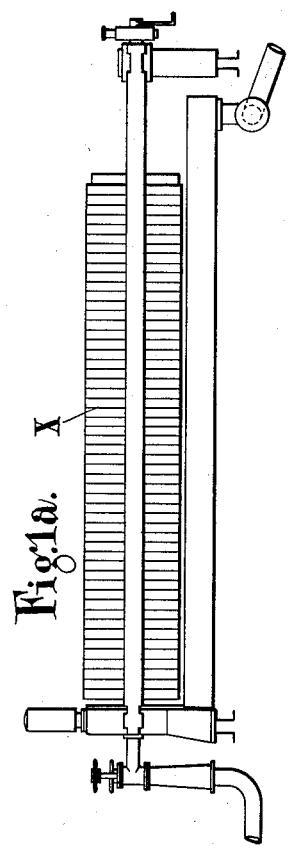
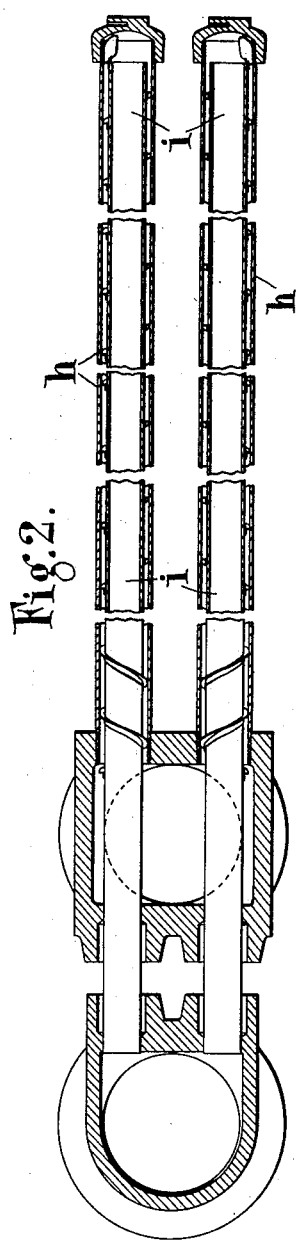
Witnesses.
William E. Baker.
J. P. Davis.
Inventor.
NILS TESTRUP
Munn & Co.
Attorneys

UNITED STATES PATENT OFFICE.

NILS TESTRUP, OF LONDON, ENGLAND, ASSIGNOR, BY MESNE ASSIGNMENTS, TO WET-CARBONIZING LIMITED, OF LONDON, ENGLAND.

TREATMENT OF SEWAGE AND THE LIKE.

1,116,953.  Specification of Letters Patent.  Patented Nov. 10, 1914.

Application filed February 7, 1912. Serial No. 676,080.

*To all whom it may concern:*

Be it known that I, NILS TESTRUP, a subject of the King of Great Britain and Ireland, and resident of 6 Broad Street Place, London, E. C., England, have invented certain new and useful Improvements Relating to the Treatment of Sewage and the like, of which the following is a specification.

This invention relates to the treatment of sewage or the like and has for its object to provide an improved process of disposal for such matters allowing of effecting this more cheaply than heretofore and in some instance without cost. This result is largely obtained by the recovery of valuable constituents of the substances.

It has been observed that when sewage is heated to a temperature of 130° C. or above, there has apparently occurred complete coagulation of the dissolved and suspended organic solids, for the liquid can after such treatment be readily filtered and press cakes of relatively low water content easily obtained.

This process can therefore be employed for the removal of the solid matters from sewage more cheaply and efficiently than heretofore, since by using suitable apparatus of high efficiency little heat need be consumed and as sterilizing is no longer the object, excessively large volumes of liquid do not need to be handled, the chief portion of the liquid being separated in settling tanks or otherwise and a concentrated liquor heated by this process while at the same time by recovering or utilizing valuable constituents of the resultant solids, the cost of the process can be still further reduced.

This invention therefore consists in applying such a process to the treatment of sewage for the purpose of removing solid matters therefrom, the sewage being preferably subjected to a preliminary concentration by settling or the like, say until it contains 7% or thereabout of solid matter.

In carrying the invention into effect in one form the sewage which has had its water content somewhat reduced is caused to enter an autoclave.

The accompanying diagrammatic drawings show an apparatus suitable for carrying out the process.

Figures 1 and 1ª show the installation in side elevation, and Fig. 2 a detailed part sectional view of one of the tube elements of the oven.

In carrying the invention into effect when employing this method, the sewage may be caused to enter an apparatus comprising a series of tubular elements, each of which consists of two concentric tubes $h$, $i$, the outer one being closed at one extremity (see Fig. 2) and the material entering at the opposite end and between the tubes and returning by the inner tube $i$ to issue from the apparatus. That extremity of the tube system which is closed ended is placed in a furnace $s$ or otherwise suitably heated, and by adjusting the relation between the inflow and outflow, a sufficient pressure can be caused to exist in the apparatus to prevent ebullition, and thus to enable the material contained in the apparatus to be raised to the required temperature while yet permitting a continuous flow. When the temperature used is only about 130° C., which corresponds to a pressure of about 25 lbs. per square inch, the walls of the tube need not be excessively thick. Experiments have shown that the higher the temperature employed the easier is the subsequent separation of the precipitated matters from the liquid, and for best results, the temperature should not fall below about 130° C.

As in an apparatus of the character described, the entering and outflowing matters are continuously flowing at a relatively rapid rate and in thin films on opposite sides of the separating wall, a high rate of transmission and a large degree of exchange is obtainable thereby.

The sewage which has passed through the apparatus, can be readily filtered in a filter press X, or otherwise to be subsequently treated for the removal of water and fatty matters. The high pressure (that corresponding to the vapor tension at 130° C. or more) at which the liquid leaves the apparatus, or a portion thereof, may be used as the pressure for the filtration by supplying the liquid directly into a filter press. The liquid effluent may be discharged at any suitable spot as it is practically devoid of smell. The effluent moreover is readily filtrable and will not if discharged on to land in a short time clog the same and render it no longer capable of taking up any more as occurs at present.

It will be observed that by heating the sewage in an autoclave to effect the coagulation of the albuminous matters, and the carbonization or other decomposition of the colloidal and similar matters rendering filtering easy, the addition of foreign materials to the sewage such as lime or the like as in existing processes becomes unnecessary. It may be possible in certain cases to use the press cake material directly for heating the autoclave.

The final result of the present process is that there is no sludge to be carried to any considerable distance, dumped, or otherwise disposed of, and it becomes only necessary to get rid of an effluent which is practically clear water.

Having now described my invention what I claim as new and desire to secure by Letters Patent is:—

1. A method of rendering the water of sewage sludge readily expressible, consisting in raising the temperature of said sludge rapidly to a temperature above 100° C., while under pressure, maintaining it for a short time only at this temperature, rapidly cooling it to a temperature below the boiling point of the accompanying water, and separating water therefrom by pressure, as set forth.

2. A method of treating sewage consisting in separating a fluid sludge therefrom by settlement, raising said fluid sludge while in rapid motion and under pressure to a temperature above the boiling point of the associated liquid, maintaining said material at this temperature until the slimy matters have become completely coagulated, transmitting the heat of said sludge to a quantity of cooler sludge about to be heated, and removing water from the already treated sludge by filtration under pressure.

In testimony whereof I affix my signature in the presence of two witnesses.

NILS TESTRUP.

Witnesses:
T. ZACLAN,
B. H. MATTHEWS.